Sept. 5, 1939. L. E. BLANCHETT Re. 21,194

LEVELING DEVICE

Original Filed May 13, 1936 2 Sheets-Sheet 1

Luther E. Blanchett.

INVENTOR.

BY Hoar, Ruhloff & Armand

ATTORNEYS.

Sept. 5, 1939. L. E. BLANCHETT Re. 21,194

LEVELING DEVICE

Original Filed May 13, 1936 2 Sheets-Sheet 2

Luther E. Blanchett.
INVENTOR.

BY Hoar, Ruhloff & Armand
ATTORNEYS.

Reissued Sept. 5, 1939

Re. 21,194

UNITED STATES PATENT OFFICE 21,194

LEVELING DEVICE

Luther E. Blanchett, South Milwaukee, Wis., assignor to Bucyrus-Erie Company, South Milwaukee, Wis., a corporation of Delaware Original No. 2,101,837, dated December 14, 1937, Serial No. 79,594, May 13, 1936. Application for reissue August 20, 1938, Serial No. 225,949

12 Claims. (Cl. 200—52)

My invention relates to new and useful improvements in leveling devices, and more particularly to leveling devices for large power excavators, and still more particularly to that level-responsive element of such leveling devices as controls the jacks or other similar elements thereof.

In this respect, my invention is an improvement on one element of the invention shown and described in the copending application of Paul S. Stevens for improvements in Leveling devices, filed October 16, 1936, Serial No. 105,888, and owned by my assignee.

The Stevens invention, thus identified, is specifically applied to large excavators which have four independent sets of caterpillar traction, one of which is mounted at each of the four corners of the base; each set supporting its corner of the base by means of an electrical, mechanical, or hydraulic jack. It is desired to control the automatic action of these jacks, by means of a level-responsive controlling device.

The most obvious control element would be a pair of pendulums, swinging in vertical planes at right angles to each other, and each such plane being parallel to the plane which contains two of the jacks. Each pendulum would swing between two electrical contacts, closing circuits to control the jacks.

It is desirable to have the leveling device be sensitive to a change of level of so little as one degree of arc. But the vibrations of a large excavator of this type, and the sudden tilts due to hooking the dipper into the bank, and then jerking on the hoist rope or on the dipper handle, with the hoist winch or the boom engine respectively, set up disturbances which are effectively many times the amount of the one degree change of level for which I wish to correct.

Accordingly I have a situation which is very similar to that existing in the most recent ether-drift experiments of Michelson and Morley, in which the probable error of each observation was of a size about 100 times the observation. Such a large error can be eliminated by making thousands of observations; but, in the case of a machine such as that under contemplation, which must act instantly and automatically upon a single observation, an error larger than the observation, or even an error commensurate with the observation, would be fatal.

The obvious solution of this difficulty would be to retard the pendulum by means of dashpots. But, in actual practice, this turned out to be wholly impractical. Most of the bad vibrations which we would wish to damp out, are harmonically periodic. The effect of the dashpots was merely to slow up the pendulum, until finally the pendulum was vibrating at the same periodic rate, 180° different in phase from the vibration of the base. Thus the dashpots result in doubling the disturbance, rather than in eliminating it.

Two types of mercury pendulum have been in use in the prior art, but neither of these showed any advantage over the above described ineffective device. One of these two types employed a long tube curved in a vertical plane, with the ends higher than the middle. The flow of mercury to one end of the tube or the other, in response to changes of level, closed electrical contacts in the end in question. In the other type, a short tube containing mercury tipped, responsive to the flow of mercury or to some other weight, thus closing contacts in one end or the other of this tube.

In view of all this ineffective prior art, it is the principal object of my invention to devise a pendulum switch which shall be sensitive to very slight changes in level, while remaining insensitive to jars and vibrations.

In addition to my principal object, above stated, I have worked out a number of novel and useful details, which will be readily evident as the description progresses.

My invention consists in the novel parts, and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figure 1:
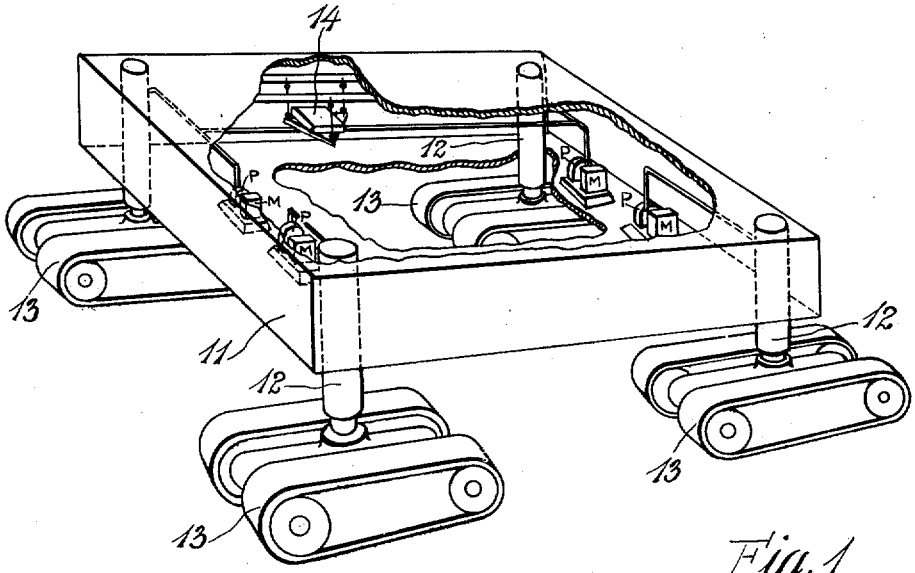
Figure 1 is a perspective view, partly cut away, of the base of an excavator possessing a leveling system which includes the device of my invention.

Referring now to Figure 1, we see that 11 is the main base of the excavator or other machine, to which it is intended to apply my invention. This base is supported, by means of four hydraulic jacks 12, on four caterpillar traction units 13, which may be propelled by any convenient means, not shown.

Associated with each jack, there is a pump P, driven by a motor M, and certain valves (not shown) all of which are operated and controlled, through certain electric interlocks (not shown) which constitute the subject-matter of the copending Stevens application, already referred to.

This control is effected by the control apparatus, designated by 14 in Figure 1, and which will now be described.

Figure 2:
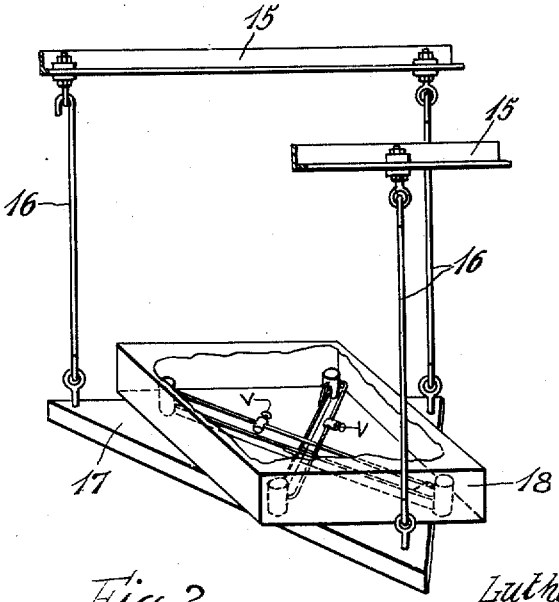
Figure 2 is a perspective view of my complete device, slightly enlarged from the showing of Figure 1, but still not completely detailed.

Turning now to Figure 2, we see that, from beams 15 of base 11, there are pivotally suspended three parallel vertical rods 16 of equal length, which in turn pivotally support triangular table 17, on which is secured box 18, holding the nerve-center of my control apparatus.

Figure 3:
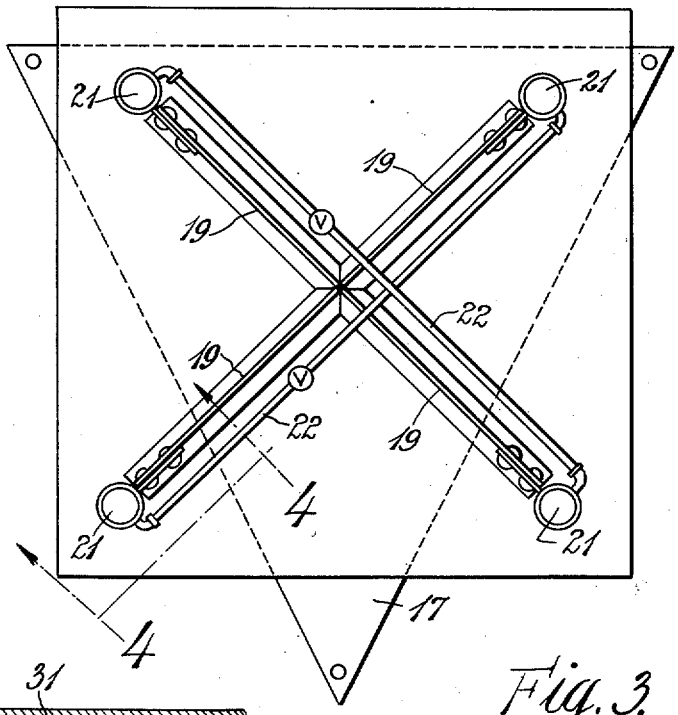
Figure 3 is a plan view, enlarged a little further, but still somewhat conventionalized, of the table and box of Figure 2.
Figure 4:
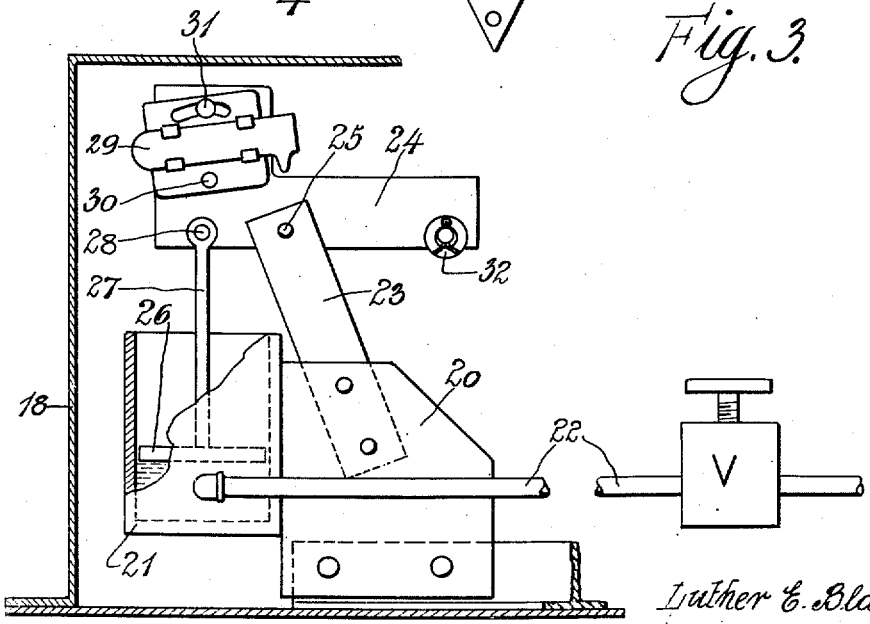
Figure 4 is a side elevation, still further enlarged, of one of the four control elements of Figure 3, taken along the line 4—4 of that figure.

Turning now to Figure 3, we see that the floor of box 18 supports two inverted T-beams 19, which cross each other at right angles.

Each T-beam supports, at each end thereof, by means of plate 20, a cylinder 21, and its associated parts, each pair of such cylinders being connected by pipe 22, containing valve V.

The box 18 is so oriented that each pair of cylinders 21 lies in a horizontal line parallel to the plane of the two jacks 12 which it controls.

Each plate 20 carries aloft, by means of extension 23, an arm 24, pivoted thereto at 25. Piston 26 has a piston-rod 27, pivoted to the arm 24 at 28.

Arm 24 carries a conventional mercury switch 29 (or any equivalent switch, which closes and opens by tilting), pivoted at 30, and secured in desired position by means of adjusting screw 31.

A counterweight 32 may be added, so that arm 24 will be evenly balanced.

The pipe 22 of each pair of cylinders 21, and the space in each cylinder below its piston 26, is filled with mercury, or other convenient fluid.

The operation of my invention is as follows.

Horizontal jars are ineffective to influence my device, due to the method of its suspension by rods 16.

Valves V are sufficiently constricted, so as to eliminate surges. A partially filled U-tube, even with such a constriction, would set up some degree of surging; but the combination of a fully filled tube with pistons at its ends, and mercury switches actuated thereby, eliminates this undesirable phenomenon.

Furthermore, the combination of my pipe 22, cylinders 21, arms 24, and tilting switch 29, is in effect a lever which multiplies the angular displacement of the main base 11 by the ratio that one half the length of pipe 22 bears to the distance from point 25 to point 28 on arm 24. Without this lever-effect, a displacement so small as 1° could not actuate switch 29. A single double-acting switch, and associated elements, actuated by one piston, is of course the equivalent of a pair of single-acting switches, and associated elements, actuated by one piston or a pair of pistons; and several of the claims have been so drawn as to cover these alternatives.

Having now described and illustrated one form of my invention, I wish it to be understood that my invention is not to be limited to the specific form or arrangement of parts hereinbefore described, except in so far as such limitations are specified in the appended claims.

I claim:

1. In a control for for a leveling device, the combination of: two inclination-responsive control means, each responsive to change of level in a vertical plane at right angles to that of the other; and means suspending the above-described apparatus from the device to be leveled, so as to permit shifting in all directions while preserving all positions of the inclination-responsive means parallel to each other.

2. In a control for a leveling device, the combination of: an inclination-responsive control means, responsive to change of level in a vertical plane; and means suspending the above-described apparatus from the device to be leveled, so as to permit shifting in all directions while preserving all positions of the inclination-responsive means parallel to each other.

3. A control for a leveling device according to claim 1, characterized by the further fact that the suspending means consists of a number of parallel members of substantially equal length, and a table suspended thereby.

4. A control for a leveling device according to claim 2, characterized by the further fact that the suspending means consist of a number of parallel members of substantially equal length, and a table suspended thereby.

5. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; means to constrict the pipe at will to any degree; a tilting element with respect to each piston, tiltably attached thereto, and having a radius of tilt materially shorter than half the center-to-center distance between the cylinders, thereby to multiply the effect of tilting of the device to be leveled; a mercury switch carried by each tilting element; and a second set of two cylinders, at least one piston, pipe, constricting means, at least one tilting element, and mercury switch, disposed at right angles to the first set.

6. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; means to constrict the pipe at will to any desired degree; a tilting element with respect to each piston, tiltably attached thereto; a mercury switch carried by each tilting element; a second set of two cylinders, at least one piston, pipe, constricting means, at least one tilting element, and mercury switch, disposed at right angles to the first set; and means suspending the above-described apparatus from the device to be leveled, so as to permit shifting in all directions while preserving all positions of said apparatus parallel to each other.

7. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; means to prevent surges in the pipe; a tilting element with respect to each piston, tiltably attached thereto, and having a radius of tilt materially shorter than half the center-to-center distance between the cylinders, thereby to multiply the effect of tilting of the device to be leveled; a mercury switch carried by each tilting element; and a second set of two cylinders, at least one piston, pipe, surge-preventing means, at least one tilting element, and mercury switch, disposed at right angles to the first set.

8. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; a tilting element with respect to each piston, tiltably attached thereto; a mercury switch carried by each tilting element; and a second set of two cylinders, at least one piston, pipe, at least one tilting element, and mercury switch, disposed at right angles to the first set; and means suspending the above- described apparatus from the device to be leveled, so as to permit shifting in all directions from the device to be leveled, so as to permit shifting in all directions while preserving all positions of said apparatus parallel to each other.

9. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; a switch, actuable by each piston; a second set of two cylinders, at least one piston, pipe, and at least one switch, disposed at right angles to the first set; and means suspending the above-described apparatus from the device to be leveled, so as to permit shifting in all directions, while preserving all positions of said apparatus parallel to each other.

10. In a control for a leveling device, the combination of: two cylinders, on substantially the same level, spaced apart a substantial distance, and adapted to contain a ponderable liquid; a pipe connecting the bottom portion of the cylinders; means associated with at least one of the cylinders to multiply the effect of change of level of the liquid in that cylinder; at least one switch, actuable by said multiplying means; and a second set of two cylinders, pipe, multiplying means, and at least one switch, disposed at right angles to the first set.

11. In a control for a leveling device, the combination of: two cylinders, on substantially the same level, spaced apart a substantial distance, and adapted to contain a ponderable liquid; a pipe connecting the bottom portion of the cylinders; means associated with at least one of the cylinders to multiply the effect of change of height of the liquid in that cylinder; at least one switch, actuable by said multiplying means; a second set of two cylinders, pipe, multiplying means, and at least one switch, disposed at right angles to the first set; and means suspending the above-described apparatus from the device to be leveled, so as to permit shifting in all directions while preserving all positions of said apparatus parallel to each other.

12. In a control for a leveling device, the combination of: two cylinders, on substantially the same level, spaced apart a substantial distance, and adapted to contain a ponderable liquid; a piston in at least one of the cylinders; a pipe connecting the bottom portions of the cylinders; a tilting element with respect to each piston, tiltably attached thereto; and a switch, actuable by tilting, and carried by each tilting element; the pipe and tilting elements being so proportioned as to materially multiply the tilt of the tilting element, in proportion to the tilt of the pipe.

LUTHER E. BLANCHETT.